Patented Sept. 30, 1952

2,612,509

UNITED STATES PATENT OFFICE 2,612,509

COMPOSITIONS DERIVED FROM BEESWAX

William C. Griffin, West Chester, Pa., assignor to Atlas Powder Company, Wilmington, Del., a corporation of Delaware No Drawing. Application May 24, 1950,
Serial No. 164,039

1 Claim. (Cl. 260—410.6)

This invention relates to beeswax derivatives and useful compositions containing the same.

Beeswax has many uses in industry and the arts, prominent among which is its employment in the manufacture of medicinal ointments and salves, and in cosmetic preparations such as lipsticks, cold creams and the like. In many of such applications the beeswax alone, or in admixture with oils constitutes the oil phase of emulsion systems which may be either of the oil-in-water, water-in-oil or a combination of both types. Because of its highly lipophilic character beeswax is a difficult wax to emulsify, particularly where oil-in-water emulsions are desired. In consequence, cold creams and like cosmetic preparations employing beeswax require the presence of very strongly hydrophilic emulsifying agents, usually soaps of the free acids naturally occurring in the beeswax, formed in situ by the addition of borax or other alkaline material. Cosmetically preferable preparations are those which are free from alkalies or alkali-forming materials, however, and this invention relates particularly to compositions containing the constituents of beeswax modified by chemical reaction to form products of increased hydrophilic properties and greater ease of emulsification.

One object of the invention is to provide compositions of chemically modified beeswax.

Another object is to provide compositions from beeswax which are more hydrophilic than unmodified beeswax.

A further object is to provide modified beeswax compositions which are self-emulsifiable.

A still further object of the invention is to provide modified beeswax compositions which serve as useful emulsifying agents.

Another object is to provide cosmetically useful compositions of improved characteristics employing beeswax derivatives.

The above and other objects of the invention will become more apparent in the course of the following description and the appended claim.

Compositions which accomplish the above objects in accordance with the present invention comprise alcoholysis reaction products between beeswax and certain polyhydric ether-alcohols to be more fully described hereinafter.

The beeswax which may be utilized in preparing the compositions of the present invention may be either yellow or bleached beeswax. These, being natural products, vary somewhat in composition from lot to lot but in general contain a major proportion of fatty acid esters of long chain monohydric alcohols, with smaller amounts of free long chain fatty acids, some hydrocarbons and very small amounts of cholesteryl esters, lactones and the like. In order to comply with United States Pharmocopoeia standards yellow beeswax has an acid value of from 18 to 24 and an ester value of from 72 to 77 while the bleached product has an acid value of from 17 to 24 and an ester value of from 72 to 79. These analytical values are cited as illustrative of the properties of the beeswax which may be used in preparing compositions of the present invention but they are not limitative. Useful compositions may be prepared from beeswax which does not comply with the requirements for U. S. P. grade although in general it is preferred to employ products which meet such requirements.

The polyhydric ether alcohols which are reacted with the beeswax are polyoxyalkylene derivatives of lower non-aromatic polyhydric alcohols. These substances include the reaction products of polyhydroxy alcohols such as the glycols, glycerol, erythritol, pentaerythritol, sorbitol, inositol, etc., and mixtures thereof with lower alkylene oxides such as ethylene and propylene oxides. One or more of the hydroxyls of any one or any mixture of the polyhydroxy alcohols may be etherified by any one or mixture of lower alkylene oxides. The average number of oxyalkylene groups per mol may vary considerably but is generally within the limits of 4 and 40.

A particularly preferred group of polyhydric ether-alcohols which have been reacted with beeswax to form the compositions of the present invention are polyoxyalkylene derivatives of lower non-aromatic polyhydric alcohols which are defined by the formula:

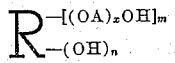

wherein R represents the residue of a non-aromatic polyhydric alcohol, said alcohol containing from 2 to 6 carbon atoms, no reactive group other than hydroxyl, and $m$ plus $n$ hydroxyl groups; $m$ represents a number from 1 to 6, $n$ represents a number from 0 to 5 and the sum of $m$ plus $n$ is from $\frac{2}{3}$ to 1 times the number of carbon atoms in R; A represents a member selected from the group consisting of ethylene and propylene radicals, and may represent both ethylene and propylene radicals in the same ether alcohol; and the product of $m$ by the average value of $x$ lies between the inclusive limits of 4 and 40.

Ether-alcohols conforming to the above formula are well known compounds and methods for their preparation need not be detailed here. Most conveniently they may be prepared by the addition reaction between ethylene oxide, propylene oxide or mixtures of the two to polyhydric alcohols coming within the above definition according to the equation:

Reference is made in this connection to U. S. Patent 1,959,930 to Schmidt and Meyer, and to U. S. Patent 2,425,845 to Toussaint and Fife. Mixtures of preformed ether-alcohols conforming to the above formula and mixtures of such ether-alcohols formed by the addition of alkylene oxides to mixtures of polyhydric alcohols or to aqueous solutions of polyhydric alcohols are equally satisfactory with the single components as reactants for forming the compositions of the present invention.

Specific ether-alcohols coming within the above preferred definition include, among others, the polyethylene glycols of average molecular weight from about 200 to about 1700; the polypropylene glycols of average molecular weight from about 250 to about 2300; diols comprising the reaction product of mixed ethylene and propylene oxides with water, wherein the number of alkylene oxide groups per mol of diol averages between 4 and 40; the hydroxy ether obtained by the addition of 20 mols of ethylene oxide to a mol of sorbitol, or other hexitol; hexa-hydroxy ethyl sorbitol; the polyoxyethylene addition product of glycerol containing 9 oxyethylene groups per mol; the mixed polyol resulting from the direct addition reaction between 725 parts by weight of ethylene oxide and 100 parts of an 85% aqueous solution of sorbitol, and the like.

The proportions in which the beeswax and the ether-alcohol are reacted in forming the composition of the present invention may be varied over a considerable range, depending in large measure upon the extent to which it is desired to develop the hydrophilic character of the product. Useful alcoholysis products are obtained when as little as 10 parts by weight or as much as 60 parts of the ether-alcohol are caused to react with 100 parts of beeswax. In general, however, preferred compositions are those obtained by alcoholysis reaction between from 20 to 50 parts by weight of an ether-alcohol as described above and 100 parts of beeswax.

The alcoholysis reaction products are prepared by heating and agitating the hereinbefore described ingredients together, preferably in the presence of known alcoholysis catalysts and in an inert atmosphere, until a sample withdrawn and allowed to stand for ten minutes shows no tendency to separate into two phases. It is preferred to maintain the mass at reaction temperature for at least 30 minutes after the obtention of a clear sample to approach more closely the true alcoholysis equilibrium point. Comparatively high reaction temperatures, preferably from about 200 to about 300° C., are employed to obtain commercially feasible rates of reaction. In this temperature range, and in the presence of 0.1% by weight of sodium hydroxide (based on the total charge weight) reaction times of from 3 to 6 hours usually suffice to produce useful compositions. At the high temperatures involved there is inevitably some darkening during the reaction, and in the interest of improving its appearance, the final product is preferably subjected to a decolorization process, as for example, a treatment with activated carbon, or a chemical bleaching treatment, as for example, with hydrogen peroxide; or with both. Where light color is not a requirement these steps may be omitted since they are without essential effect on the emulsifying tendencies of the product.

The following examples illustrate more specifically the preparation of beeswax alcoholysis products in accordance with the invention.

Example I

A reaction flask equipped with an agitator and means for maintenance of an inert atmosphere was charged with 418 grams of the polyoxyethylene ether of sorbitol containing an average of 20 oxyethylene groups per mol, 982 grams of beeswax and 1.4 grams of sodium hydroxide (added in the form of 500 grams per liter aqueous solution). The charge was heated to a temperature of about 275° C., with constant agitation in an atmosphere of carbon dioxide. Completion of the reaction as indicated by failure of a withdrawn sample to separate into two phases required 3 hours. Twenty-eight grams of activated decolorizing carbon were added and heating was continued for an additional hour at the same temperature. The charge was allowed to cool to about 120° C., and was filtered free of carbon. The filtrate was then bleached by heating in the range of 100° to 120° C., for 30 minutes with 14 grams of 30% hydrogen peroxide solution.

The final product was a light tan, waxy solid, similar to beeswax in consistency and odor, but unlike beeswax in that the alcoholysis product was self-dispersible in warm water to form an emulsion which remained stable on cooling below the melting point of the wax.

Example II

The reaction flask of Example I was charged with 229 grams of the polyoxyethylene ether of sorbitol containing an average of 6 oxyethylene groups per mol, 1877 grams of beeswax and 2.1 grams of sodium hydroxide (added in the form of 500 grams per liter aqueous solution). The charge was heated with constant agitation to a temperature of about 275° C., in an atmosphere of carbon dioxide until a withdrawn sample did not separate into two phases. The reaction time was 4 hours. Forty-two grams of activated decolorizing carbon were added and heating continued at the same temperature for an additional hour. The charge was cooled to about 120° C., and was filtered free of carbon. The filtrate was then bleached by heating in the range of 100 to 120° for 30 minutes with 21 grams of hydrogen peroxide solution.

The final product was a waxy solid of a darker tan than the product of Example I. This material was more hydrophilic than beeswax but was not self-dispersible in water. It may be rendered water dispersible, however, by addition of the more hydrophilic beeswaxes described in this application, such as that of Example I, or by addition of any conventional compatible dispersing agent such as polyoxyethylated derivatives of the esters of long chain fatty acids with polyhydroxy organic compounds, the esters of long chain fatty acids with polyoxyethylated polyhydroxy compounds, soaps, etc.

Example III 527 grams of a mixture of glycols and polyoxyethylene sorbitol ether, obtained by the reaction of 725 parts of ethylene oxide with 100 parts of 85% aqueous sorbitol, were charged into the reactor along with 873 grams of beeswax and 1.4 grams of sodium hydroxide (added in the form of 500 grams per liter aqueous solution). The charge was heated with constant agitation to a temperature of about 275° C., in an atmosphere of carbon dioxide. At the end of 4½ hours, a withdrawn sample failed to separate into two phases indicating completion of the reaction. Twenty-eight grams of activated decolorizing carbon were added and heating was continued for an additional hour at the same temperature. The charge was allowed to cool and was filtered free of carbon. The filtrate was then bleached by heating in the range of 100 to 120° C., for about 30 minutes with 14 grams of hydrogen peroxide solution.

This material was similar in appearance to that obtained in Example I, above. It was self-dispersible and was slightly more hydrophilic than the product of Example I.

*Example IV*

The reaction flask was charged with 418 grams of polypropylene glycol which had an average molecular weight of 750, 982 grams of beeswax and 1.4 grams of sodium hydroxide (added in the form of 500 grams per liter aqueous solution). The charge was heated with constant agitation to a temperature of about 275° C., in a carbon dioxide atmosphere. After four hours at this temperature a withdrawn sample failed to separate into two phases, indicating completion of the reaction. Twenty-eight grams of activated decolorizing carbon were then added and heating was continued for an additional hour at the same temperature. The charge was allowed to cool to about 120° C., and was filtered free of carbon. The filtrate was bleached by heating in the range of 90 to 95° C., for 30 minutes with 14 grams of 30% hydrogen peroxide solution.

The resulting product was similar to that of Example I, but lighter in color. It was self-dispersible in water.

*Example V*

The reaction flask was charged with 148 grams of the polyoxyethylene derivative of glycerol containing an average of six oxyethylene groups per mol, 1252 grams of beeswax and 1.4 grams of sodium hydroxide (added in the form of 500 grams per liter aqueous solution). The charge was heated to a temperature of about 275° C., with constant agitation in a carbon dioxide atmosphere. Completion of the reaction, as indicated by failure of a withdrawn sample to separate into two phases, required two hours. The charge was allowed to cool to about 120° C., and was filtered free of carbon. The filtrate was bleached by heating with 14 grams of 30% hydrogen peroxide solution in the range of 90–95° C., for 30 minutes.

The final product was a light colored, hard, waxy material. It was not self-dispersible in water but was more hydrophilic than beeswax and was easily rendered dispersible in water by the addition of dispersing agents, for instance, as outlined in Example II, above.

The compositions of the present invention described generically and illustrated specifically above cover a considerable range of hydrophile-lipophile balance. In general, the hydrophilic character of the products is more pronounced the greater the proportion of polyhydric ether-alcohol in the reaction mixture. Furthermore, per unit weight, the higher molecular weight polyoxyethylene ethers are more effective in enhancing the hydrophilic character than are polyoxyproplyene ethers or lower molecular weight polyoxyethylene ethers.

Those skilled in the art will recognize that by blending the more lipophilic and more hydrophilic of the modified beeswax compositions effective combinations for a great range of uses may be obtained. It will be further recognized that the products of the present invention may be formulated with other nonionic surface active agents to yield valuable compositions. And, while one of the objects of the invention is to prepare a beeswax composition which can be formulated into cosmetic emulsion without the use of soap or alkali there is no incompatability between the products of the invention and soap, or other ionic surface active agents, and, if desired, compositions containing such agents and the modified beeswax derivatives may be prepared.

The following examples illustrate useful applications of the compounds of the present invention as dispersible waxes, as sole emulsifying agents and as auxiliary emulsifying agents. The first of these examples (Example VI) illustrates the preparation of a soap-free cold cream containing beeswax.

*Example VI*

A cream of the following composition was prepared:

| | Per cent |
|---|---|
| Mineral oil | 50 |
| Beeswax | 7 |
| Polyoxyethylene sorbitan monopalmitate containing 20 oxyethylene groups per mol | 2 |
| The reaction product of 1 mol of polyoxyethylene sorbitol containing an average of 20 oxyethylene groups per mol, with 5 mols of beeswax | 8 |
| Water (containing preservative) | 33 |

The cream was prepared by heating the oil and water phases separately to 70°. The oil phase was then slowly added to the water and preservative with constant agitation of the mixture. Stirring was continued during cooling. Perfume was added at 50° C. The cream was poured hot.

The resulting product is a soft, high gloss cream which is very smooth textured. It "peaks" well and liquefies very readily when applied.

The following example illustrates a soap free cold cream in which the beeswax is entirely replaced by beeswax derivative.

*Example VII*

A mixture of the following composition was prepared:

| | Per cent |
|---|---|
| Mineral oil | 50 |
| The reaction product of 1 mol of polyoxyethylene sorbitol, containing an average of 6 oxyethylene groups per mol, with 5 mols of beeswax | 12 |
| The reaction product of 1 mol of polyoxyethylene sorbitol containing an average of 20 oxyethylene groups per mol with 5 mols of beeswax | 3 |
| Water (containing preservative) | 35 |

The mixture was prepared as in Example VI, by melting and stirring the oil phase and pouring it into the hot water, preservative mixture. The resulting cream was perfumed at 50° C., and poured while hot.

The product is a soft, glossy cream which "peaks" well. It liquefies very readily and has good stability at elevated temperatures.

The nonionic hydrophilic beeswax emulsifiers are entirely compatible with the conventional soap-containing preparations and may be used therewith as exemplified by the following example.

Example VIII

A mixture of the following composition was prepared:

| | Per cent |
|---|---|
| Mineral oil | 30.0 |
| Beeswax | 12.0 |
| The reaction product of 1 mol of polyoxyethylene sorbitol containing an average of 6 oxyethylene groups per mol, with 4 mols of beeswax | 3.5 |
| The reaction product of 1 mol of polyoxyethylene sorbitol containing an average of 20 oxyethylene groups per mol, with 4 mols of beeswax | 1.5 |
| Water (with preservative) | 52.0 |
| Borax | 1.0 |

The mixture was prepared by heating the oil phase and the water, borax, preservative phase separately to 70° C., followed by the slow addition of the oil phase to the water phase with constant agitation. Stirring was continued during cooling. The mixture was perfumed at 50° C. The cream was poured hot.

This is a soft, very smooth white cream which has excellent stability at high temperatures. It liquefies readily when applied to the skin. It "peaks" well.

These beeswax derivatives are useful generally in cosmetic preparation wherever beeswax is conventionally employed. The resulting preparations are characterized by increased emulsion stability. The following example illustrates the use of the described beeswax derivatives in hair dressing, the beeswax derivatives retaining some of the slight tackiness of beeswax.

Example IX

A mixture of the following composition was prepared:

| | Per cent |
|---|---|
| Mineral oil | 20.0 |
| Beeswax | 5.0 |
| The reaction product of 1 mol of polyoxyethylene sorbitol containing an average of 6 oxyethylene groups per mol, with 6 mols of beeswax | 2.5 |
| The reaction product of 1 mol of polyoxyethylene sorbitol containing an average of 20 oxyethylene groups per mol, with 4 mols of beeswax | 2.5 |
| Water (containing preservative) | 70.0 |

The mixture was prepared by heating each of the oil and water phases separately to 70° C. The oil phase was then slowly poured into the water phase with constant agitation of the mixture. Stirring was continued during cooling. Perfume was added at 50° C.

The resulting emulsion is moderately heavy but pours readily from a standard bottle. It has excellent high temperature stability.

Any of the commonly employed preservatives may be used such as sodium benzoate, methyl para-hydroxy benzoate, propyl para-hydroxy benzoate, butyl para-hydroxy benzoate, etc.

Many other uses and combinations of the products disclosed above will occur to formulators of cosmetics and emulsion specialties. With the aid of preceding description and illustrative examples those skilled in the art will be able to choose the proper compounds or blends of compounds to obtain the desired set of properties.

What is claimed is:

A composition of matter comprising a reaction product of about 100 parts of beeswax with from about 10 to about 60 parts by weight of a polyoxyethylene sorbitol, containing from 4 to 40 oxyethylene groups per mol, the said oxyethylene groups being distributed over a plurality of the carbon atoms in the sorbitol carbon chain.

WILLIAM C. GRIFFIN.

REFERENCES CITED

The following references are of record in the file of this patent:

UNITED STATES PATENTS

| Number | Name | Date |
|---|---|---|
| 2,025,612 | Rodman | Dec. 24, 1935 |
| 2,233,382 | De Groote | Feb. 25, 1941 |
| 2,478,820 | Griffin | Aug. 9, 1949 |

FOREIGN PATENTS

| Number | Country | Date |
|---|---|---|
| 380,431 | Great Britain | 1932 |

OTHER REFERENCES

Atlas Spans and Atlas Tweens Surface Active Agents, Nov. 1942, pages 4, 7, 8.